United States Patent
Adachi

(10) Patent No.: US 8,934,938 B2
(45) Date of Patent: Jan. 13, 2015

(54) WIRELESS COMMUNICATION SYSTEM, WIRELESS COMMUNICATION METHOD, AND BASE STATION DEVICE

(75) Inventor: Hiroto Adachi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 200 days.

(21) Appl. No.: 13/446,979

(22) Filed: Apr. 13, 2012

(65) Prior Publication Data

US 2012/0276943 A1    Nov. 1, 2012

(30) Foreign Application Priority Data

Apr. 26, 2011   (JP) ................................. 2011-098583

(51) Int. Cl.
  *H04B 7/00*    (2006.01)
  *H04B 7/02*    (2006.01)
  *H04B 7/04*    (2006.01)
  *H04B 7/06*    (2006.01)

(52) U.S. Cl.
  CPC .............. *H04B 7/024* (2013.01); *H04B 7/0465* (2013.01); *H04B 7/0691* (2013.01)
  USPC ....................................................... 455/522

(58) Field of Classification Search
  USPC ................. 455/522, 562.1; 370/329; 375/267
  See application file for complete search history.

(56) References Cited

U.S. PATENT DOCUMENTS

| | | | |
|---|---|---|---|
| 2004/0165676 A1 | 8/2004 | Krishnan et al. | |
| 2005/0163244 A1 | 7/2005 | Seto et al. | |
| 2005/0272382 A1 | 12/2005 | Amano | |
| 2008/0108310 A1* | 5/2008 | Tong et al. | 455/69 |
| 2009/0202009 A1 | 8/2009 | Sandell et al. | |
| 2010/0041408 A1* | 2/2010 | Caire et al. | 455/446 |
| 2010/0166098 A1* | 7/2010 | Luz et al. | 375/267 |
| 2010/0304773 A1* | 12/2010 | Ramprashad | 455/509 |
| 2011/0085448 A1* | 4/2011 | Kuwahara | 370/242 |

FOREIGN PATENT DOCUMENTS

| | | | |
|---|---|---|---|
| JP | 2005-198215 A | 7/2005 | |
| JP | 2005-348116 A | 12/2005 | |

(Continued)

OTHER PUBLICATIONS $3^{rd}$ Generation Partnership Project; Technical Specification Group Radio Access Network; Feasibility Study for Further Advancement for E-UTRA (LTE-Advanced), (Release 9),TR 36.912 Chapter 7.1 Downlink Spatial Multiplexing, 4 pages, Jun. 2010.

(Continued)

*Primary Examiner* — Lewis West
(74) *Attorney, Agent, or Firm* — Foley & Lardner LLP

(57) ABSTRACT

In a cellular wireless communication system with plural antenna base stations, signals have been basically transmitted using two antennas among plural antennas, and thus power has been concentrated in specific antennas. The present invention controls the transmission power of each antenna so as not to increase the transmission power of specific antennas by effectively using plural antennas and frequency bands. A frequency band is divided into plural sub-bands, and antennas used for transmission are spread to the sub-bands. In each sub-band, power is not allocated to an antenna that is not used for transmission. As a result, the transmission power of each antenna can be balanced, and power can be prevented from being concentrated in specific antennas.

6 Claims, 12 Drawing Sheets

(56) References Cited

FOREIGN PATENT DOCUMENTS

| | | |
|---|---|---|
| JP | 2006-518971 A | 8/2006 |
| JP | 2009-188997 A | 8/2009 |

OTHER PUBLICATIONS

IEEE P802.16m/D11 Part 16.3.6.1 Downlink MIMO Architecture and Data Processing, Part 16: Air Interface for Broadband Wireless Access Systems, pp. 722-730, Jan. 27, 2011.

* cited by examiner

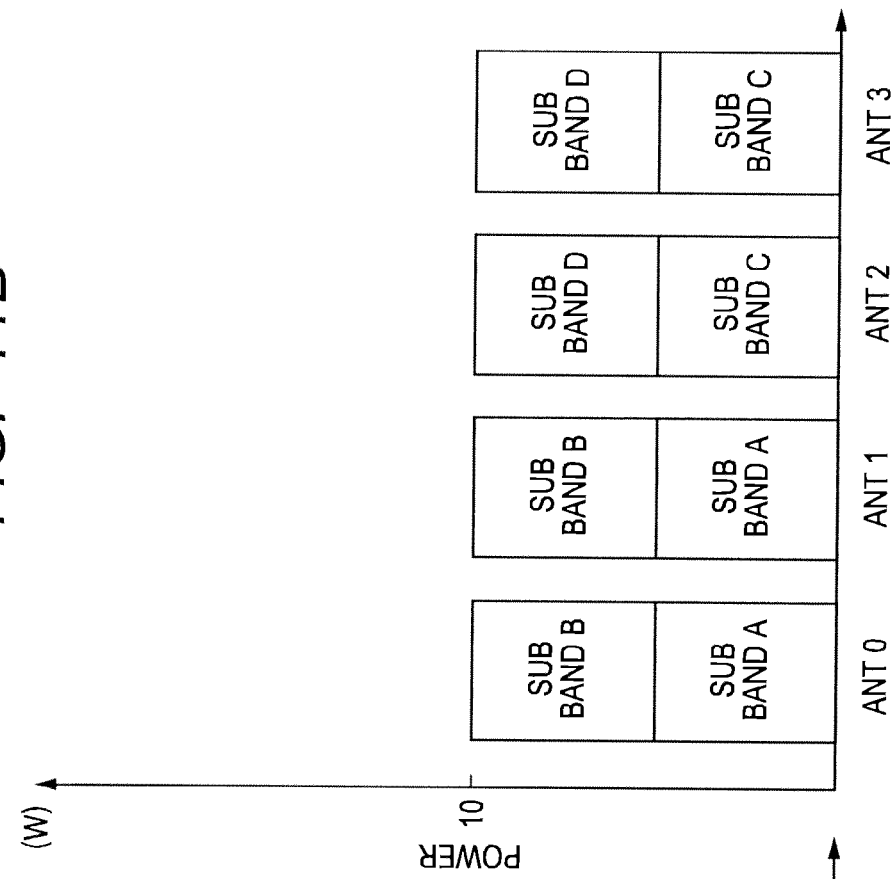
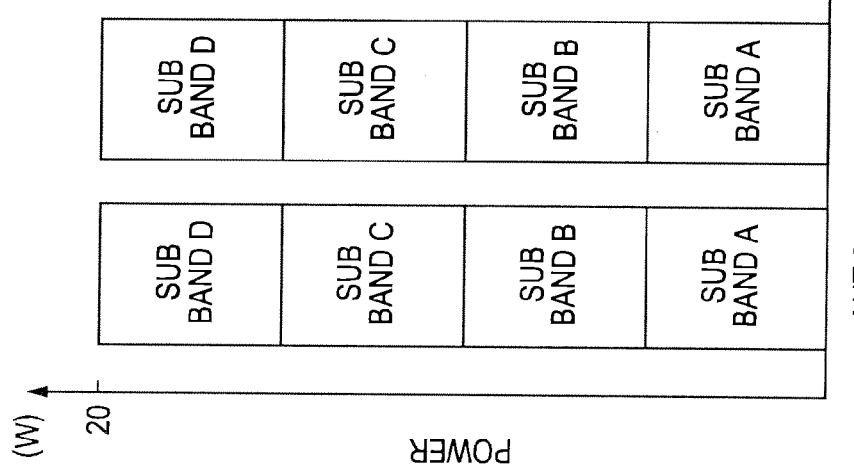

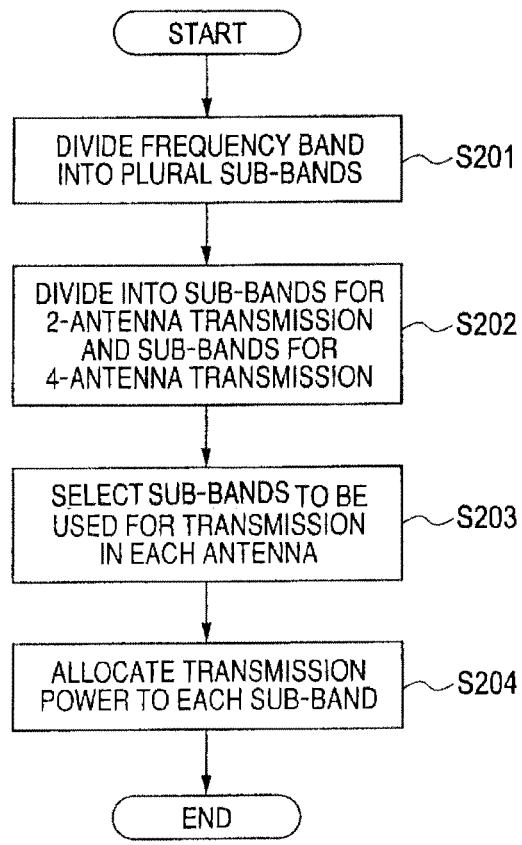

WIRELESS COMMUNICATION SYSTEM, WIRELESS COMMUNICATION METHOD, AND BASE STATION DEVICE

CLAIM OF PRIORITY

The present application claims priority from Japanese patent application serial no. 2011-098583, filed on Apr. 26, 2011, the content of which is hereby incorporated by reference into this application.

BACKGROUND OF THE INVENTION

The present invention relates to a wireless communication system, a wireless communication method, and a base station device, and particularly to a wireless communication system, a wireless communication method, and a base station device for controlling transmission power or allocating channels in an antenna-rich base station of a cellular wireless communication system.

1. Cellular Wireless Communication System

In mobile wireless communications, a cellular communication system is common because communications are performed in service areas expanding as planes. In the cellular communication system, plural base stations are scattered in service areas, and areas (where terminals can communicate) covered by the respective base stations are connected to each other, so that planar coverage areas can be realized. A configuration of a cellular wireless communication system is shown in FIG. 1. As shown in FIG. 1, plural base stations 1 and plural terminals 10 exist in the system. Terminals 10-1, 10-2, 10-3, and 10-4 wirelessly communicate with abase station 1-1. Each of the base stations 1 is connected to a network device 20 to secure wired communication channels. In FIG. 1, the terminal 10-1 communicates with the closest base station 1-1 from which preferable signals can be received.

Each of the base stations 1 transmits a reference signal (or preamble signal) that is a unique recognition signal to allow terminals to recognize the base station. The reference signal is designed so as to be unique in the corresponding area in terms of a group of signals to be transmitted, a transmission time or frequency, or a combination of a group of signals and a transmission time or frequency. Each terminal 10 receives the unique reference signal transmitted from each base station 1, and measures the reception intensities thereof to be compared to each other, so that each terminal 10 recognizes wireless conditions with adjacent plural base stations 1. Each terminal 10 determines a base station 1 whose reference signal is the highest in the reception intensity as the closest base station. If it is determined that the currently-connected base station that is the highest in the reception intensity (namely, that provides the most preferable reception condition) has been changed to an adjacent one, a handover is conducted to switch the connection to the adjacent base station by which a more preferable reception condition can be expected.

FIG. 1 shows a downlink signal (communications from a base station to a terminal) A and an uplink signal (communications from a terminal to a base station) B for the base station 1-1. The base station 1-1 transmits the downlink signal A and the base station 1-2 transmits a downlink signal C. The base stations simultaneously transmit the signals at the same frequency and times, and thus there is a possibility that the downlink signals A and C interfere with each other.

The terminal 10-1 located at a boundary of a cell receives a desired signal A from the base station 1-1, but simultaneously receives an interference wave C from the base station 1-2. Thus, the terminal 10-1 is affected by the interference wave C. A ratio of interference and noise power to desired signal power is called Signal Interference and Noise Power Ratio (SINR), and is calculated by desired signal power/(interference power+noise power). At a boundary of a cell, interference from another cell is intensified, and the denominator becomes greater. Thus, the SINR is deteriorated and it is difficult to transmit information with a high throughput rate.

2. Fourth Generation Mobile Wireless Communication System

Recently, the technology of a fourth generation mobile wireless communication system (IMT-Advanced) has been actively developed. As IMT-Advanced, there are LTE-Advanced and IEEE802.16m discussed by the standardization organization 3rd Generation Partnership Project (3GPP) and IEEE, respectively. In these communication systems, broadband transmission using frequency bands higher than those employed in conventional communication systems is realized, and an Orthogonal Frequency Division Multiplexing Access (OFDMA) system is applied, so that high frequency usage efficiency can be realized by sharing plural sub-carriers among plural users.

In addition, it has been discussed that a base station and a terminal are provided with up to eight and four Multi-Input Multi-Output (MIMO) antennas, respectively. In such an antenna-rich system, plural antennas and frequency bands are effectively used, so that the link budget may be improved.

In LTE-Advanced and IEEE802.16m, signals are transmitted using two antennas as standard and basic operations even if the base station is provided with four antennas. The base station transmits signals using four antennas in accordance with capabilities of users.

"3GPP TR 36.912, Section 7.1, Downlink spatial multiplexing" is the standard of LTE-Advanced. Further, "IEEE 802.16m D11, Section 16.3.6.1, Downlink MIMO architecture and data processing" is the standard of IEEE802.16m.

3. Related Technology

FIG. 2 is a configuration diagram for showing a baseband transmission signal processor. FIG. 2 shows a block diagram of an MIMO-OFDMA baseband transmission signal processor 100 employed in a wireless communication system such as Long Term Evolution (LTE) discussed by the standardization organization 3GPP or IEEE802.16m discussed by IEEE. The base station device communicates with plural terminals (user i to user k), and generates signals for plural users. In the first place, channel encoders 101 perform Forward Error Correction (FEC) encoding for input transmission data of plural users i to k so as to protect against errors of propagation channels. Next, modulators 102 convert the error correcting-encoded data into modulated signals. The modulated signal is a signal having a constellation on an IQ signal plane such as QPSK, 16 QAM, and 64 QAM. The converted and generated modulated-signals are input to MIMO encoders 103. The MIMO encoders 103 distribute the sequentially-aligned modulated signals to plural antennas.

Outputs of the MIMO encoders 103 are input to power controllers 104. The power controllers 104 adjust the transmission power of each user in accordance with power allocation determined by a scheduler (not shown).

Signals with the power controlled by the power controllers 104 are input to a resource unit mapper 105 in which the signal of each user is mapped to a resource allocated to each user in accordance with frequency resource allocation determined by the scheduler. Mapping to the resource is performed for each antenna. An Inverse FFT (IFFT) 106 converts frequency domain information of each antenna into a time domain signal. A Cyclic Prefix Inserter (CPI) 107 adds a CP to the obtained time domain signal to complete the baseband transmission signal process.

FIG. 3 is a configuration diagram for showing details of the MIMO encoder 103. FIG. 3 shows a case in which up to four antennas are used. A layer mapper 110 sequentially distributes the input modulated-signals to plural layers. In the case of transmitting the signals with four antennas, the layer mapper 110 distributes the signals to all of four layers (four antenna ports). In the case of transmitting the signals with two antennas, the layer mapper 110 distributes the signals to two predetermined antenna ports (two layers corresponding to the antenna ports 0 and 1 in the example of the drawing). Outputs of the layer mapper 110 are input to a pre-coder 111.

The pre-coder 111 performs a process of adding specified weight to the input signals. The specified weight is composed of predetermined complex numbers, and individual weight is added to each layer distributed by the layer mapper. Plural options are prepared as specified weight. The option of weight prepared in advance is called a code book. The code book is shared by terminals.

A terminal receives a reference signal (a preamble signal, a mid-amble signal, or a pilot signal) and adds the weight of the code book to the reference signal on a trial basis to calculate the received SINR. Then, appropriate weight for the terminal is determined on the basis of which weight of the code book is optimum as the SINR. When the appropriate weight is determined, the terminal feeds back the identifier thereof to the base station. On the basis of the feedback information of the identifier indicating the appropriate weight received from the terminal, the base station transmits a signal to the corresponding terminal using the appropriate weight corresponding to the identifier. Therefore, in response to the identifier information of the code book from the scheduler, the pre-coder 111 extracts the corresponding weight from the memory and adds the same to information distributed to each layer. Further, predetermined weight may be added between a base station and a specific terminal without using the feedback information.

In the case of transmitting signals using four antennas, the pre-coder 111 outputs the signals using the antenna ports 0 to 3. In the case of transmitting signals using two antennas, the pre-coder 111 outputs the signals using antenna ports 0 and 1. Therefore, if all users transmit signals using two antennas, power is concentrated in the antenna ports 0 and 1. Thus, transmission amplifiers capable of outputting high transmission power are needed for the antennas 0 and 1.

FIG. 4 is a diagram for showing an example of power control in Fractional Frequency Reuse (FFR), as a concrete example of power control. The horizontal axis of the drawing represents a frequency and the vertical axis represents transmission power in each frequency domain. In FFR, a frequency band is divided into plural sub-bands as shown in the drawing, and transmission output and desired signal power as the numerator of SINR are increased in a specific frequency to reduce affects of interference from an adjacent base station. In addition, transmission power is weakened in a specific frequency to reduce interference to an adjacent base station as the denominator of SINR, so that the throughput of a terminal existing at a boundary of a cell connected to the adjacent station is improved. For example, even if transmission power is weakened in a specific frequency and a terminal that communicates using the frequency is located near a base station, affects of interference from the adjacent base station are small. As described above, a frequency (hereinafter, referred to as a sub-band) that is given priority is selectively used between adjacent base stations, so that interference between cells is reduced. In the example of FFR of the drawing, a sub-band 1 in which transmission power is high is used for a boundary of a cell, and sub-bands 2 and 3 in which transmission power is low are used for the center of a cell. In FFR, transmission power can be adjusted on the basis of allocation of transmission power as shown in the drawing so as to lower the transmission power in the all sub-bands by a certain value or to further suppress the transmission power in a sub-band in which the transmission power is low.

In the FFR technology, transmission power is decentralized in the sub-bands and a limit is put on power of total frequencies, so that transmission power in each sub-band can have a degree of freedom while putting a limit on the total transmission power. However, signals have been transmitted from all antennas at the same power in view of transmission power of each antenna by focusing on each sub-band. It has been impossible to individually change the transmission power of sub-bands between antennas.

If a base station has four antennas but basically transmits signals using only two of them, power is concentrated in specific two antennas among four. Therefore, transmission amplifiers capable of outputting high transmission power are needed for specific antennas. Specifically, if it is assumed that the total amount of transmission power of four antennas, namely, the maximum transmission output of the entire base station device is 40 W, the maximum output of the transmission amplifier of each antenna is ideally 10 W that is calculated by dividing the maximum output of the entire device by the number of transmission antennas. Accordingly, the maximum output of each amplifier can be kept low, leading to reduction in cost and downsizing of the device. However, power is normally concentrated in specific two antennas as described above. Therefore, at least 20 W-class transmission amplifiers are needed as amplifiers connected to specific two antennas.

In general, the higher a transmission amplifier becomes in maximum transmission output, the larger its size becomes. In order to achieve low cost and downsizing of the base station device, there has been needed a method in which there is no difference of transmission power between antennas and amplifiers each having as low maximum output as possible can be employed, a base station device, or a wireless communication system.

SUMMARY OF THE INVENTION

In view of the foregoing problem, the present invention discloses transmission power control for each antenna so that power distributed to specific antennas is allowed to be decentralized so as not to be concentrated by using distribution of frequency bands in power allocation to plural antennas. In addition, the present invention realizes low cost and downsizing of a base station device.

According to the first solving means of the present invention, there is provided a wireless communication system including base station devices each having an antenna power allocation function, the system realizing a coverage area while scattering the plural base station devices each having plural antennas in service areas and controlling to transmit signals in specific sub-bands using antennas the number of which is smaller than that provided at each of the base station devices, wherein if a frequency band is divided into plural sub-bands and there are plural sub-bands in which signals are transmitted using antennas the number of which is smaller than that provided at each of the base station devices, antennas used for transmission are different depending on sub-bands.

According to the second solving means of the present invention, there is provided a wireless communication method in a wireless communication system realizing a coverage area while scattering plural base station devices each having plural antennas in service areas, the method controlling to transmit signals in specific sub-bands using antennas the number of which is smaller than that provided at each of the base station devices, the wireless communication method comprising the steps of: dividing a frequency band into a plurality of first sub-bands for transmitting signals using the plurality of antennas and a plurality of second sub-bands for transmitting signals using the half of the antennas; selecting antennas for transmitting each of the second sub-bands; and determining transmission power of each sub-band on a basis of the number of first sub-bands and the number of the second sub-bands, where the transmission power of the first sub-band and the transmission power of the second sub-bands can be adjusted to be different from each other.

According to the third solving means of the present invention, there is provided a base station device in a wireless communication system realizing a coverage area while scattering plural base station devices each having plural antennas in service areas, the base station device controlling to transmit signals in specific sub-bands using antennas the number of which is smaller than that provided at each of the base station devices, the base station device including: a processor that, if a frequency band is divided into plural sub-bands and there are plural sub-bands in which signals are transmitted using antennas the number of which is smaller than that provided at each of the base station devices, controls transmission power so that antennas used for transmission are different depending on sub-bands; and a transmission signal processor that transmits signals using the antenna to which transmission power is allocated on the basis of the transmission power allocated to each sub-band by the processor.

According to the present invention, transmission power of each antenna can be balanced and signals can be transmitted while preventing transmission power from being concentrated in specific antennas in an antenna-rich system in which signals are basically transmitted using two antennas.

BRIEF DESCRIPTION OF THE DRAWINGS

Preferred embodiments of the present invention will now be described in conjunction with the accompanying drawings, in which;

FIGS. 11A and 11B are diagrams for explaining an example of comparing the amount of transmission power allocation for each antenna with the conventional amount of transmission power allocation for each antenna; and FIG. 12 is a flowchart for explaining operations of transmission power allocation/frequency resource allocation executed by a scheduler.

DETAILED DESCRIPTION OF THE EMBODIMENT

Figure 1:
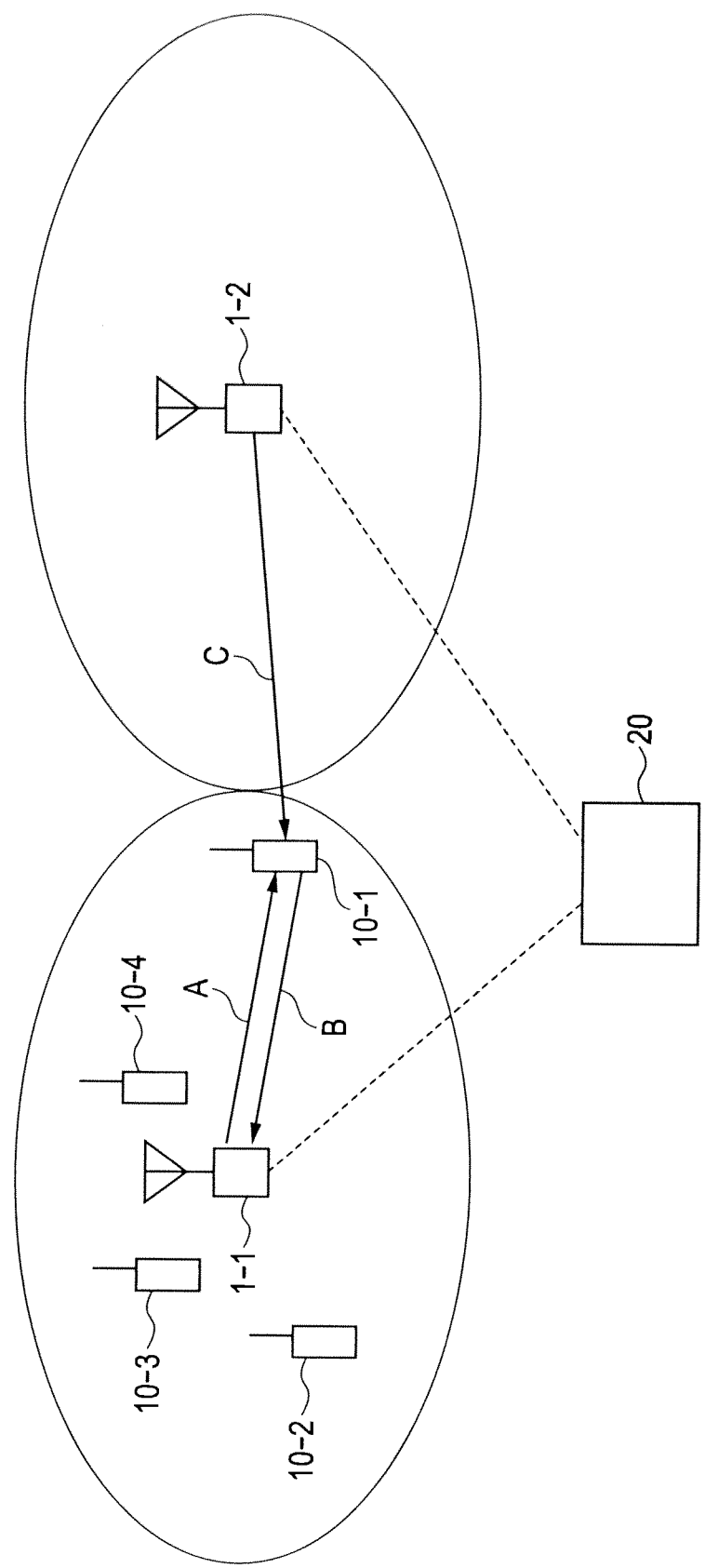
FIG. 1 is a block diagram of a wireless communication system.
Figure 2:
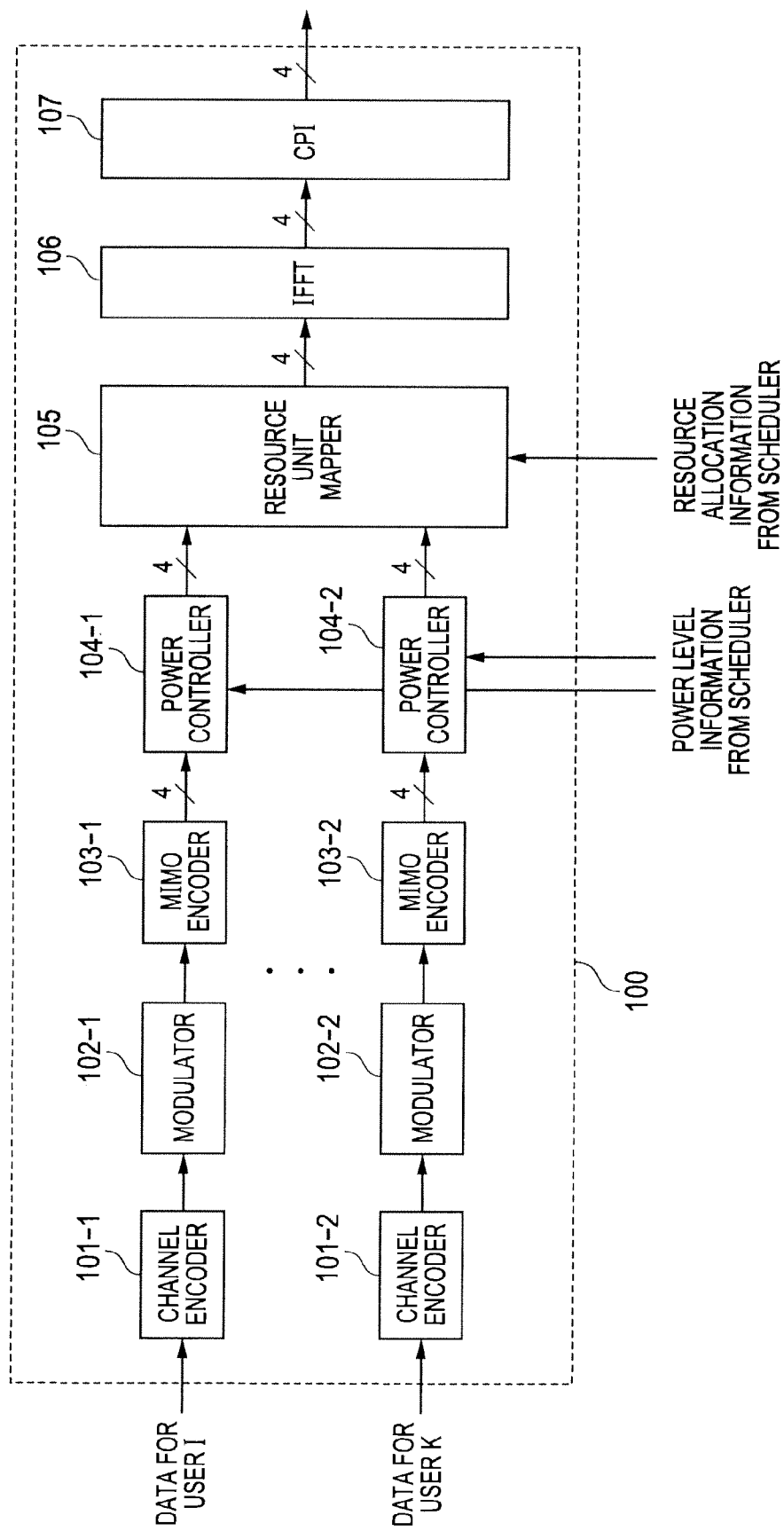
FIG. 2 is a block diagram of a baseband transmission signal processor.
Figure 3:
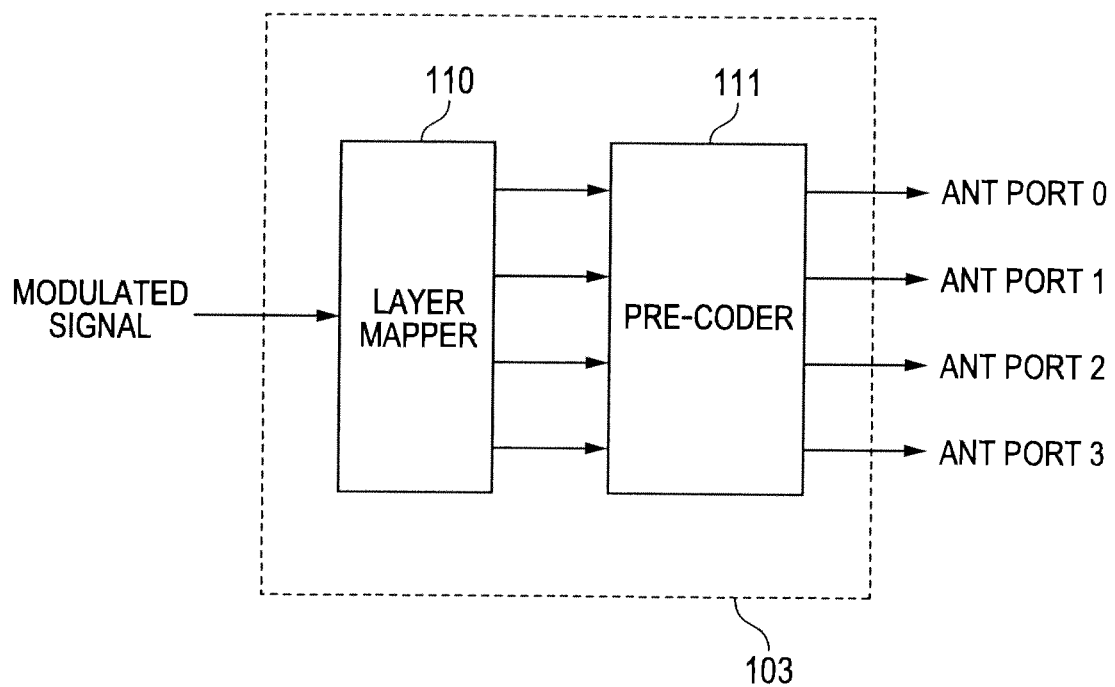
FIG. 3 is a block diagram of an MIMO encoder.
Figure 4:
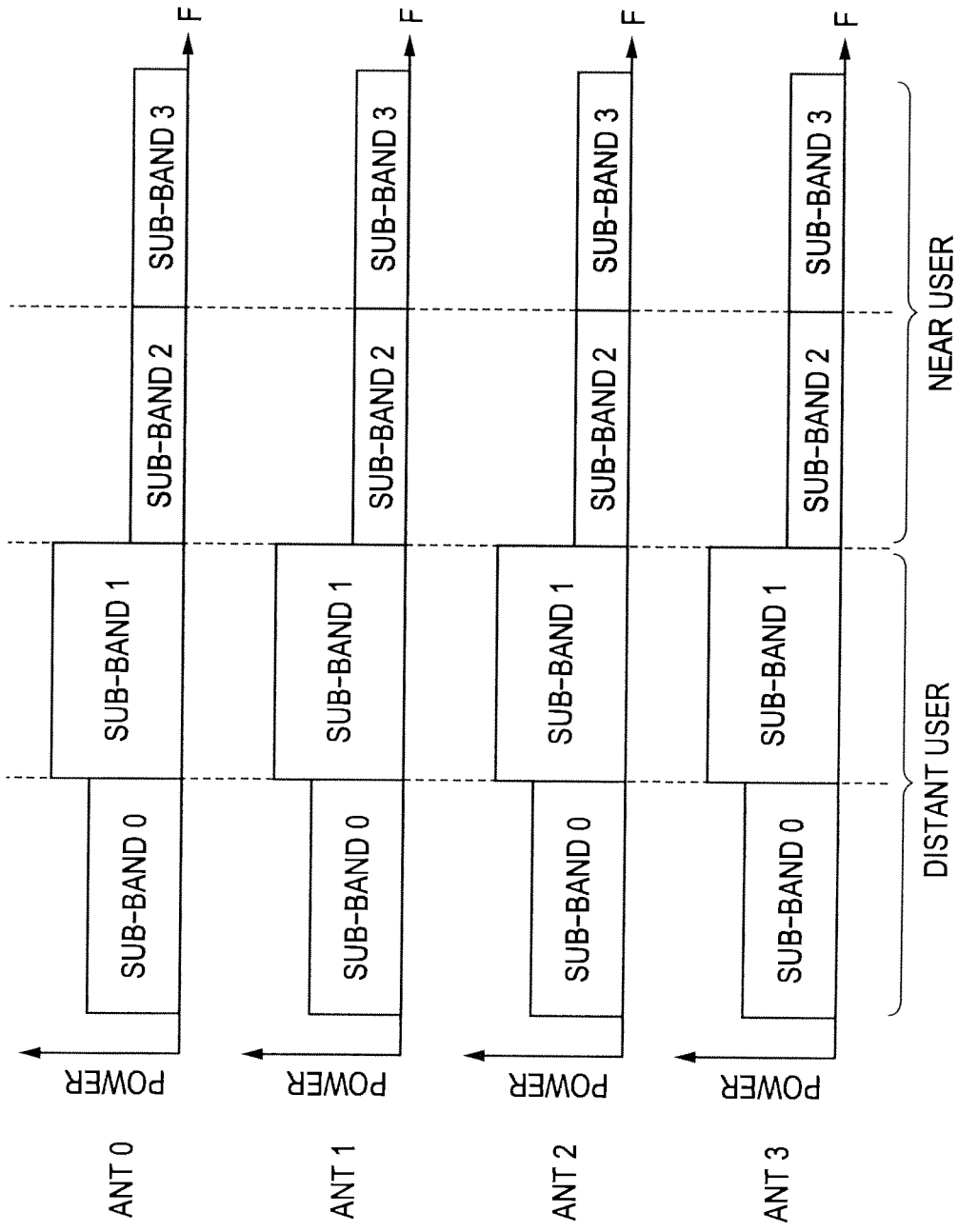
FIG. 4 is a diagram for explaining FFR.

Hereinafter, embodiments will be described in detail with reference to the drawings. It should be noted that substantially the same constitutional elements are given the same reference numerals, and the explanations thereof will not be repeated. Further, LTE-Advanced and IEEE802.16m will be exemplified as wireless communication systems, but wireless communication systems are not limited to those.

First Embodiment

It has been proposed in the fourth generation communications that the number of antennas of each of base stations and terminals is four or more. Regarding LIE-Advanced and IEEE802.16m, it has been discussed that each base station is provided with up to eight antennas and each terminal is provided with four antennas. However, signals are transmitted using two antennas in standard and basic operations.

In view of the foregoing, in the case where signals are basically transmitted using two antennas, plural antennas and frequency bands are effectively used to avoid concentration of power on specific antennas and to equalize transmission power between antennas in the first embodiment.

Figure 5:
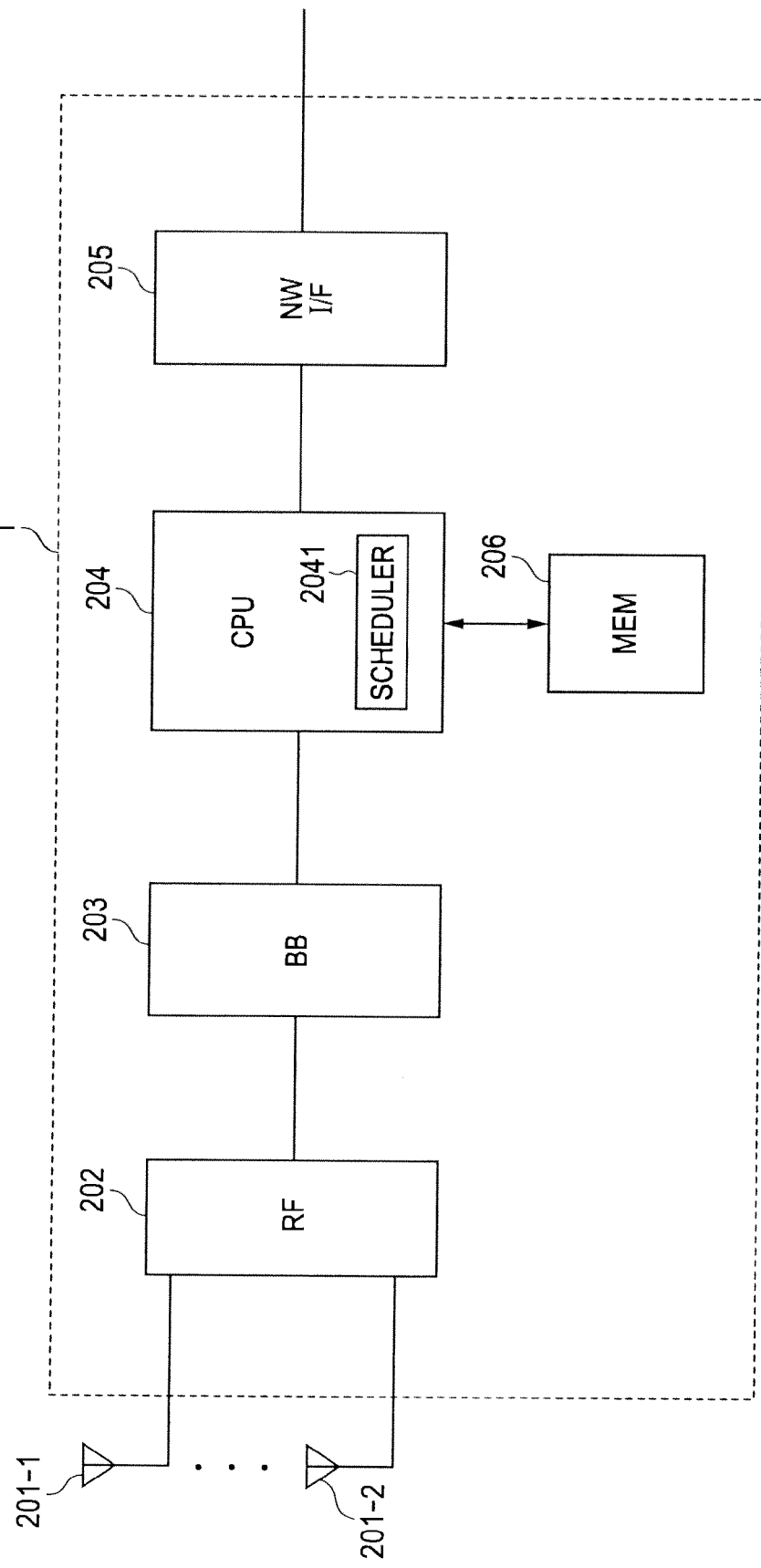
FIG. 5 is a block diagram of a base station device.

With reference to FIG. 5, a base station device will be described. In FIG. 5, a base station device 1 includes antennas 201, a Radio Frequency (RF) 202, a baseband signal processor 203, a CPU 204, a Network (NW) I/F 205, and a memory 206. The CPU 204 includes a scheduler 2041.

The NW I/F 205 is an interface with a network. The CPU 204 controls the entire base station device. The scheduler 2041 is incorporated in the CPU 204, and determines transmission timing, a transmission beam, a modulation encoding method, and transmission power allocation/frequency resource allocation. The memory 206 accumulates control information necessary for transmission/reception and downlink signals transmitted from a network. The baseband signal processor 203 performs a baseband signal process. The RF 202 performs a conversion process between an analog transmission/reception signal and a baseband signal.

Figure 6:
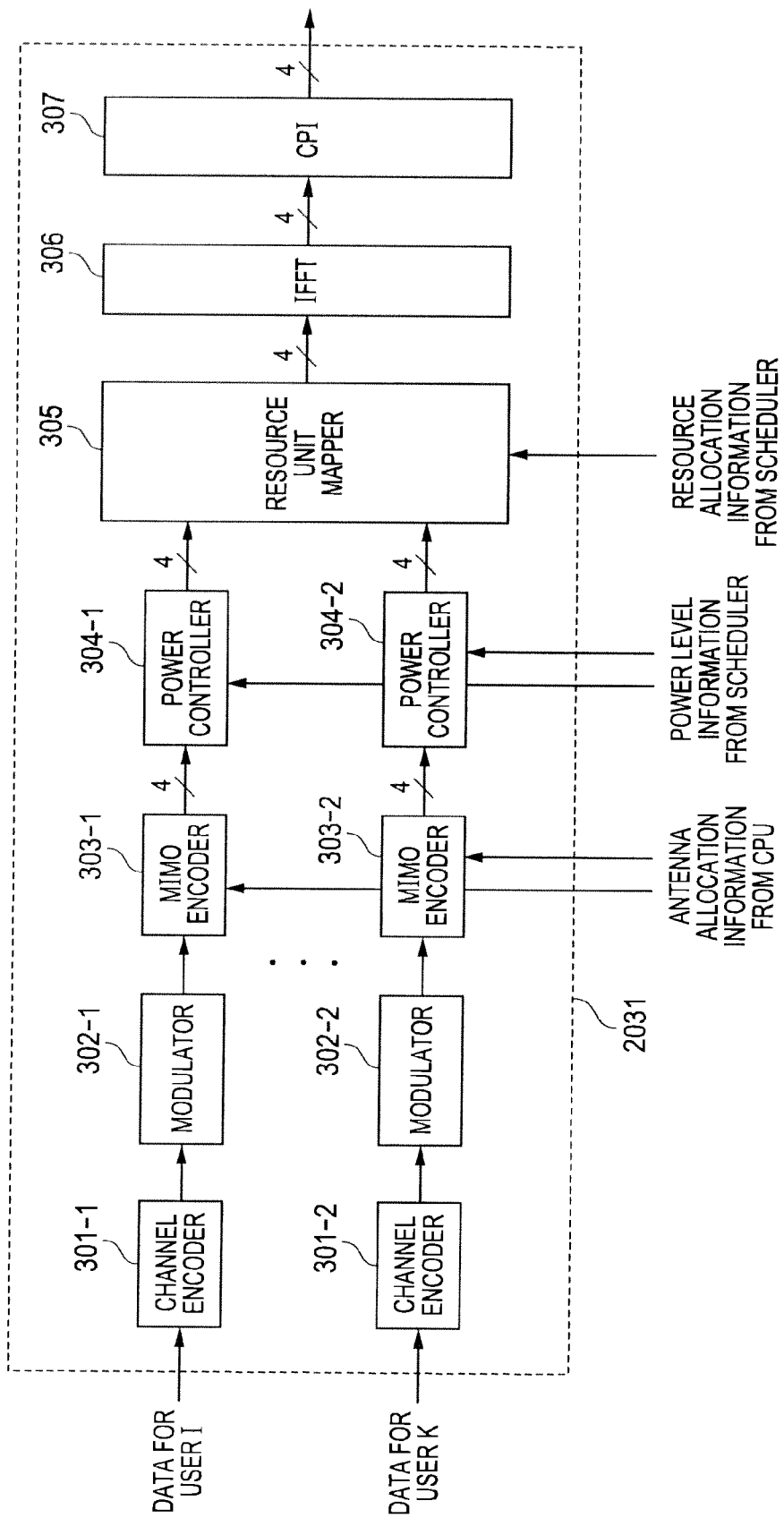
FIG. 6 is a block diagram of a transmitter of a baseband signal processor.

With reference to FIG. 6, a transmitter 2031 of the baseband signal processor 203 will be described. In FIG. 6, the transmitter 2031 of the baseband signal processor 203 includes channel encoders 301, modulators 302, MIMO encoders 303, power controllers 304, a resource unit mapper 305, an IFFT 306, and a CPI 307.

The channel encoders 301 perform error-correcting encoding for transmission data of plural users i to k. The modulators 302 perform a modulation process. The MIMO encoders 303 perform a conversion process to MIMO. The power controllers 304 adjust transmission power. The resource unit mapper 305 performs mapping to a resource allocated to each user in accordance with frequency resource allocation determined by the scheduler 2041. The IFFT 306 converts a frequency domain signal to a time domain signal. The CPI 307 adds a CP.

It should be noted that the number of outputs of each of the MIMO encoders 303, the power controllers 304, the resource unit mapper 305, the IFFT 306, and the CPI 307 is four corresponding to the number of antennas.

Figure 7:
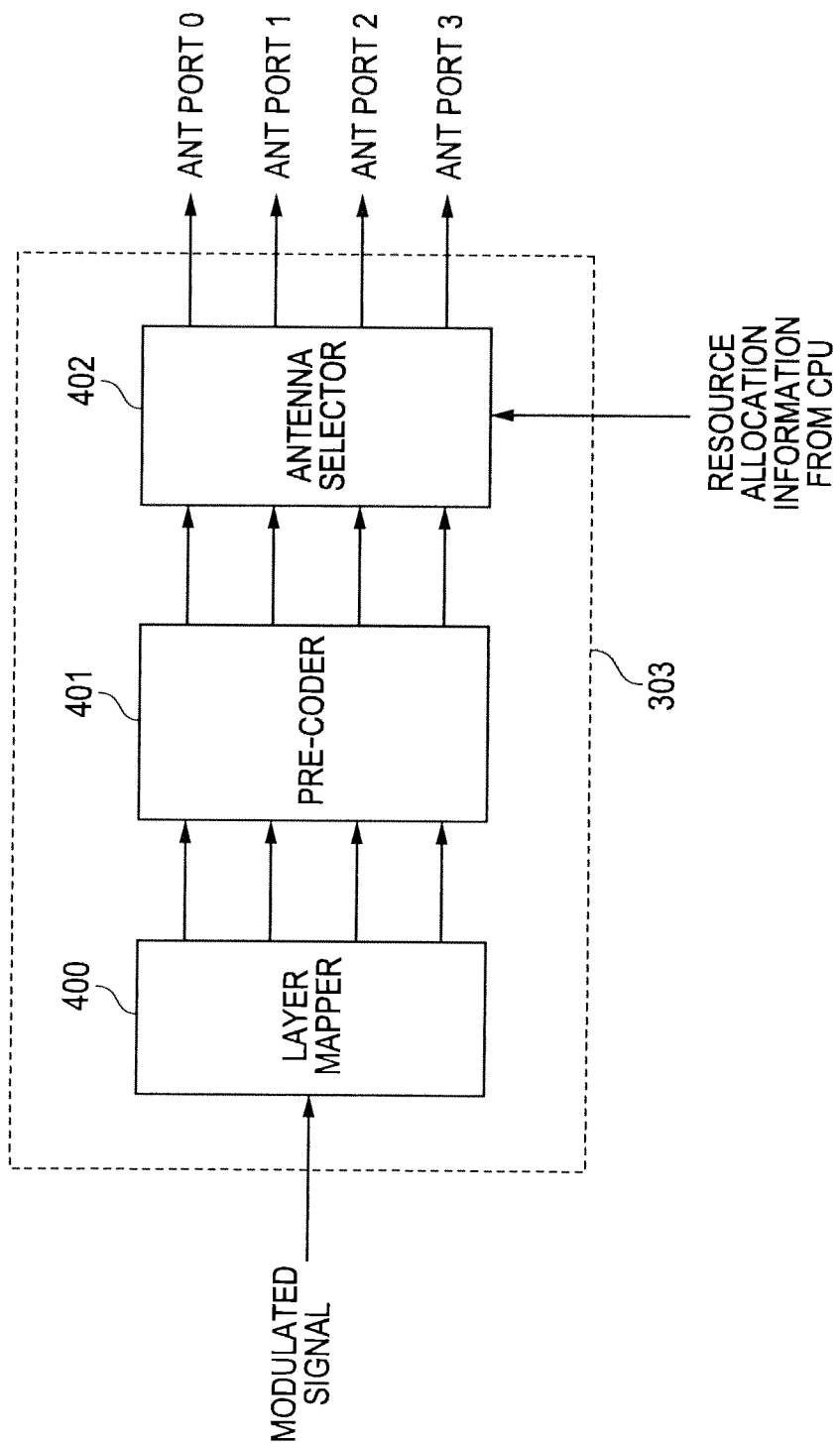
FIG. 7 is a block diagram of an MIMO encoder.

With reference to FIG. 7, the MIMO encoder 303 will be described in detail. In FIG. 7, the MIMO encoder 303 includes a layer mapper 400, a pre-coder 401, and an antenna selector 402.

The layer mapper 400 converts serial input signals into parallel MIMO signals. The pre-coder 401 adds specified weight. Detailed operations of the antenna selector 402 will be described later.

Figure 8:
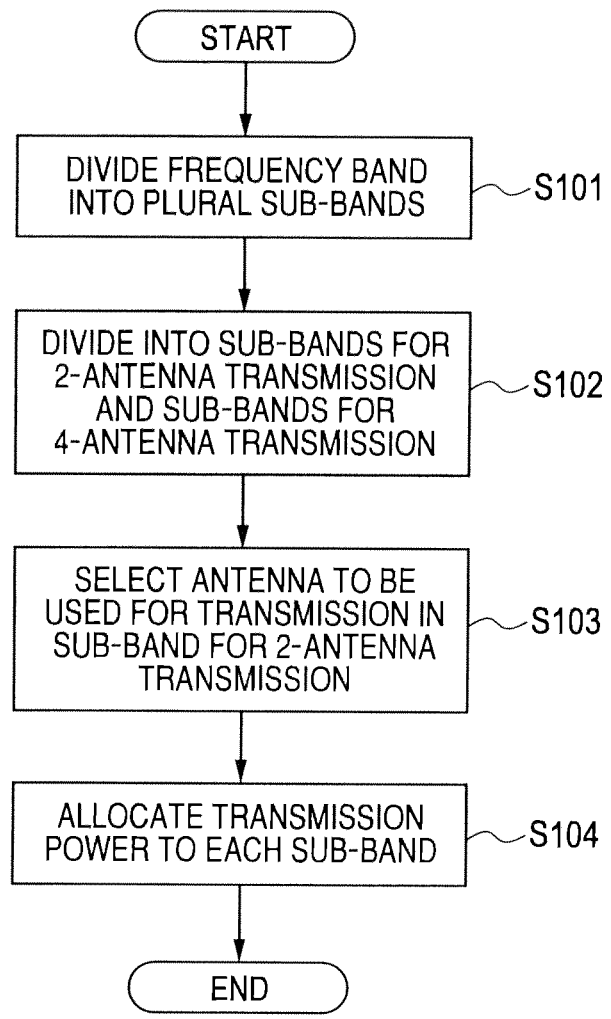
FIG. 8 is a flowchart for explaining operations of transmission power allocation/frequency resource allocation executed by a scheduler.

With reference to FIG. 8, operations of transmission power allocation/frequency resource allocation by the scheduler 2041 will be described. In FIG. 8, the scheduler 2041 divides a frequency band into plural sub-bands (S101). Here, it is assumed that the number of divided sub-bands is represented as Nsubband. The scheduler 2041 divides the sub-bands into those for transmission using two antennas and those for transmission using four antennas (S102).

If it is assumed that the number of sub-bands for 2-antenna transmission is represented as Nsubband-2 and the number of sub-bands for 4-antenna transmission is represented as Nsubband-4, the scheduler 2041 determines the number of sub-bands to satisfy the following relations.

$$N_{subband} = N_{subband-2} + N_{subband-4} \quad \text{(Formula 1)}$$

$$N_{subband-2} \bmod 2 = 0 \quad \text{(Formula 2)}$$

Formula 2 is necessary to equalize transmission power between the antennas. As a method of dividing into sub-bands for 2-antenna transmission and 4-antenna transmission, the sub-bands are allocated to 4-antenna transmission and 2-antenna transmission in ascending order of frequencies.

The scheduler 2041 selects 2 antennas used for transmission in the respective sub-bands among those for 2-antenna transmission (S103). Antennas 0 and 1 are selected for the lower half of the frequencies of the sub-bands for 2-antenna transmission 2, and antennas 2 and 3 are selected for the other half, so that antennas used in the respective sub-bands are determined. Antennas that are not selected in the respective sub-bands are not used for transmission, and power allocation (to be described later) is not set for the antennas.

The scheduler 2041 allocates transmission power to each sub-band (S104). If it is assumed that the sum of transmission power of the sub-bands in which signals are transmitted from the antennas is represented as Tx and the transmission power in the sub-band for 2-antenna transmission is represented as Tx_2, the scheduler 2041 allocates Tx_2 so as to fall within the range specified by the following.

$$\frac{Tx}{N_{subband-2}/2 + N_{subband-4}} \leq Tx\_2 \leq \frac{2Tx}{N_{subband}} \quad \text{(Formula 3)}$$

The left-hand side of Formula 3 represents a value obtained by dividing Tx by the total number of sub-bands in which signals are transmitted from the antennas, namely, a value that equalizes the transmission power of each sub-band. The right-hand side of Formula 3 represents a value obtained by concentrating power uniformly allocated to each sub-band on two antennas in the case where signals are transmitted from 4 antennas in the all frequency bands. If Tx_2 is determined, transmission power Tx_4 in the sub-band for 4-antenna transmission is uniquely determined as follows.

$$Tx\_4 = \frac{Tx - N_{subband-2} \cdot Tx\_2/2}{N_{subband-4}} \quad \text{(Formula 4)}$$

The transmission power can be freely changed within a range satisfied by Formula 3 or Formula 4 in accordance with requirements of the system.

Figure 9:
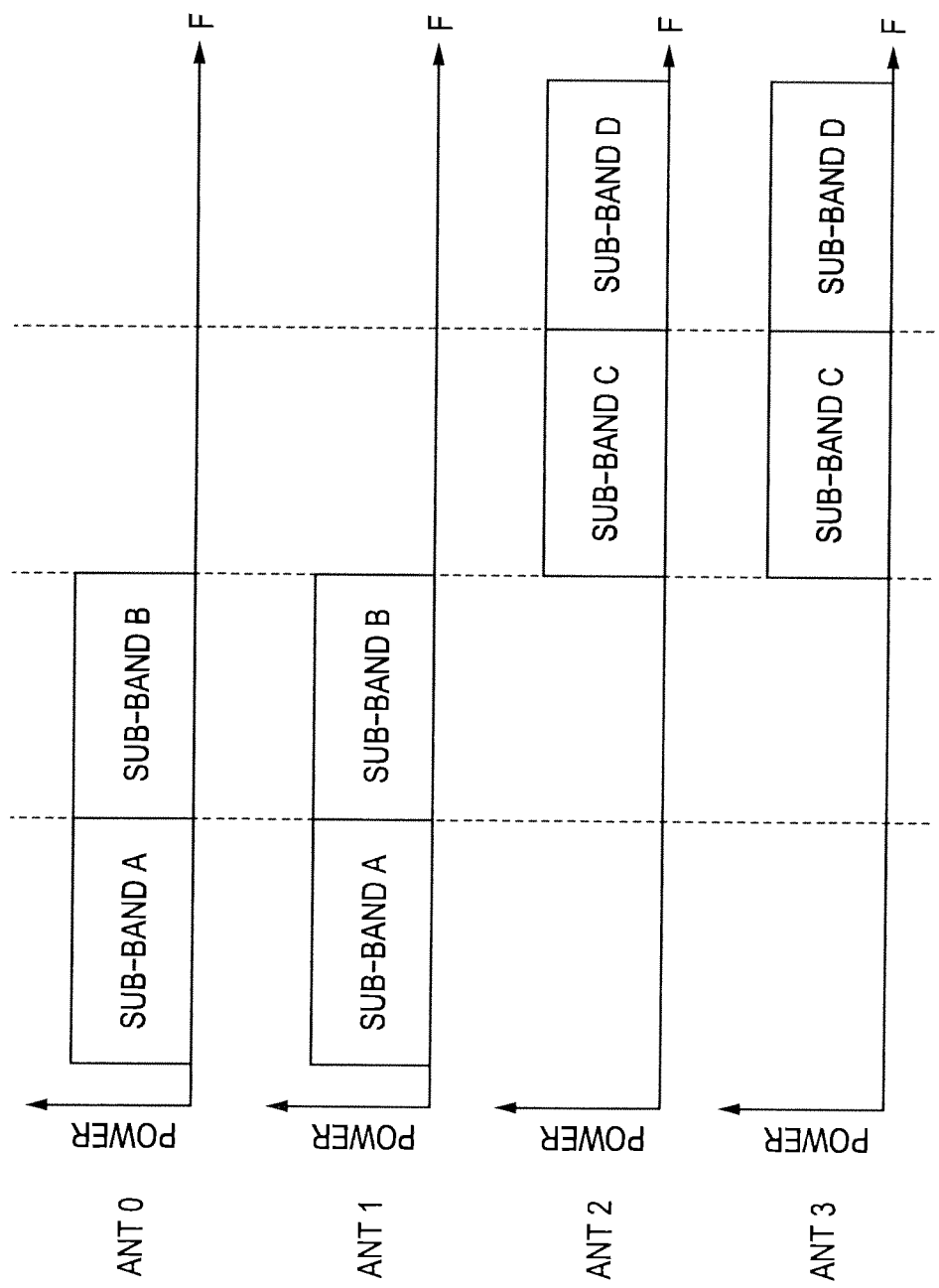
FIG. 9 is a diagram for explaining a transmission power amount and frequency allocation for each antenna in a frequency domain.
Figure 10:
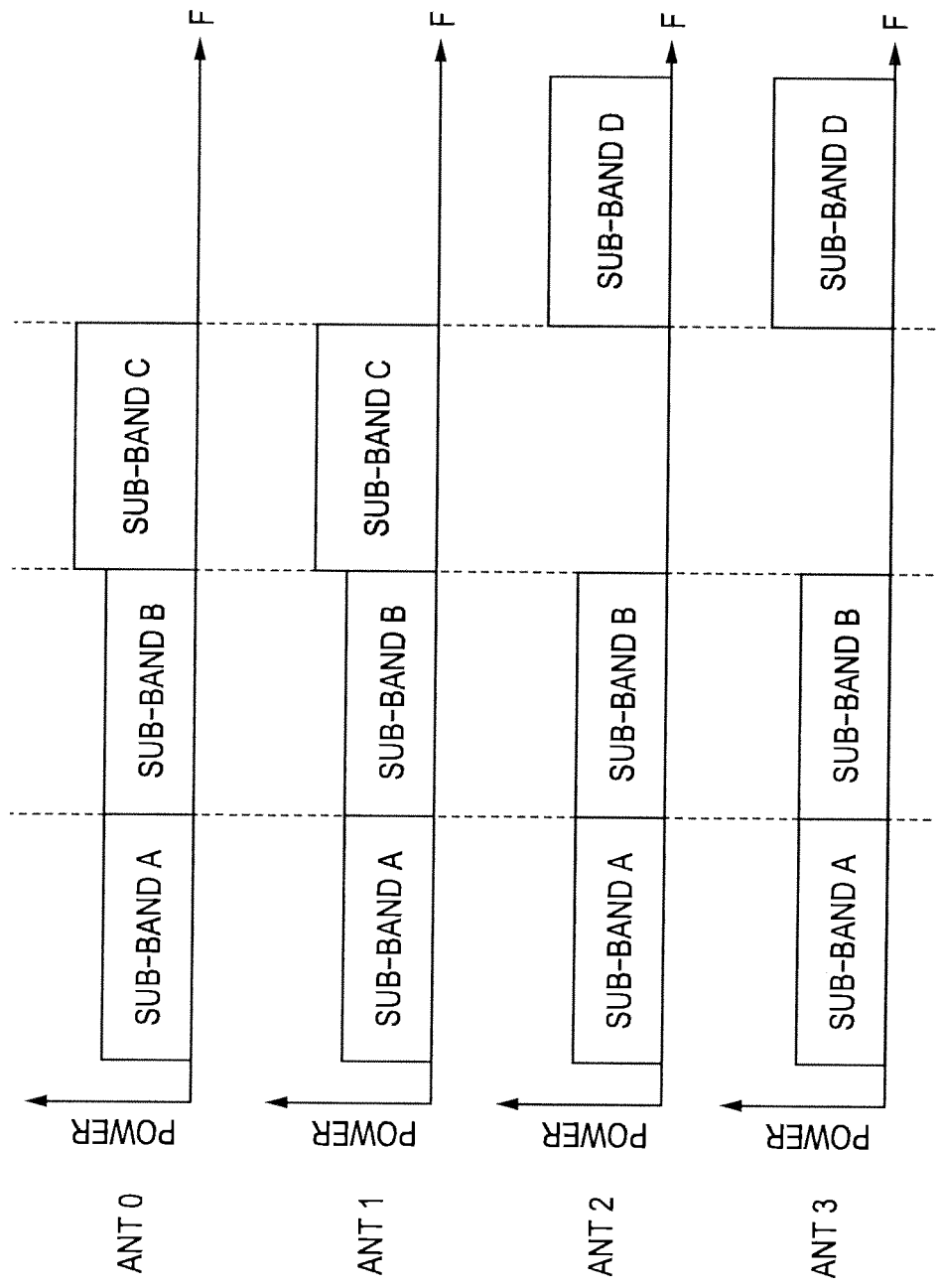
FIG. 10 is a diagram for explaining a transmission power amount and frequency allocation for each antenna in a frequency domain.

With reference to FIG. 9 and FIG. 10, there will be described the amount of transmission power of each antenna and frequency allocation to each antenna in the frequency domain in the case where the base station device is provided with four antennas.

FIG. 9 shows a case in which Nsubband=4, Nsubband-2=4, and Nsubband-4=0. In FIG. 9, sub-bands A and B are those for 2-antenna transmission using the antennas 0 and 1 as transmission antennas. On the other hand, the sub-bands C and D are those for 2-antenna transmission using the antennas 2 and 3 as transmission antennas.

FIG. 10 shows a case in which Nsubband=4, Nsubband-2=2, and Nsubband-4=2. In FIG. 10, the sub-bands A and B are those for 4-antenna transmission. The sub-band C is one for 2-antenna transmission using the antennas 0 and 1 as transmission antennas. The sub-band D is one for 2-antenna transmission using the antennas 2 and 3 as transmission antennas.

In FIG. 10, power per antenna for 2-antenna transmission is set higher than that for 4-antenna transmission.

With reference to FIGS. 11A and 11B, the amount of transmission power allocation for each antenna in the case of Nsubband=4, Nsubband-2=4, and Nsubband-4=0 will be described while being compared with the amount of conventional transmission power allocation for each antenna. FIG. 11A shows conventional power allocation, and FIG. 11B shows power allocation of the first embodiment. In FIGS. 11A and 11B, if it is assumed that the total amount of transmission power of all antennas is 40 W, a power of 20 W is concentrated in each of the antennas 0 and 1 as main antennas because an antenna used for transmission is not selected in each sub-band in a conventional example. As a result, 20 W-class transmission amplifiers are needed for these antennas.

On the other hand, since an antenna used for transmission is selected in each sub-band in the first embodiment, the transmission power of each antenna uniformly becomes 10 W, and 10 W-class transmission amplifiers can be applied to the all antennas.

A frequency band is divided into plural sub-bands and an antenna used is suitably selected in each sub-band as described above. Thus, power can be prevented from being concentrated in specific antennas and the transmission power of each antenna can be balanced. In addition, if the maximum transmission output of the entire base station device is constant, the transmission power of a specific antenna does not become higher. Thus, the same link budget can be realized with transmission amplifiers requiring less average power as compared to a conventional case. Accordingly, the first embodiment is highly advantageous also in the aspect of downsizing the base station device.

The sub-band division information, antenna and transmission power allocation information used for each sub-band are stored in the memory 206. It should be noted that signals of plural users may be simultaneously transmitted in a sub-band. Transmission data of plural users is processed to transmission signals using these pieces of information. Hereinafter, a transmission signal process of the first embodiment will be described.

Referring back to FIG. 5, the NW I/F 205 receives first a downlink signal transmitted from a network. The memory 206 connected to the CPU 204 temporarily accumulates the received signal. For the received signal, the scheduler 2041 incorporated in the CPU 204 determines transmission timing, a transmission beam, a modulation encoding method, sub-band division information, antenna and transmission power allocation information used for each sub-band, and frequency resource allocation. The received signal is processed to a transmission signal in accordance with the determination.

In FIG. 6, the channel encoders 301 perform error-correcting encoding for transmission date of users accumulated in the memory 206 connected to the CPU 204. Next, the modulators 302 convert the error correcting-encoded data into modulated signals. The modulated signal is a signal having a constellation on an IQ signal plane such as QPSK, 16 QAM, and 64 QAM.

In FIG. 7, the layer mapper 400 of the MIMO encoder 303 sequentially distributes the converted, generated, and input modulated-signals to plural layers. In the case of transmitting the signals with four antennas, the layer mapper 400 distributes the signals to all of four layers. In the case of transmitting the signals with two antennas, the layer mapper 400 distributes the signals to two layers corresponding to the antennas 0 and 1.

Outputs of the layer mapper 400 are input to the pre-coder 401. The pre-coder 401 performs a process of adding specified weight to the input signals. In the case of transmitting the signals with four antennas, the pre-coder 401 outputs the signals using the antennas 0 to 3. On the other hand, in the case of transmitting the signals with two antennas, the pre-coder 401 outputs the signals using the antennas 0 and 1.

Outputs of the pre-coder 401 are input to the antenna selector 402. In the case of 4-antenna transmission, the antenna selector 402 directly outputs the input signals. However, in the case of 2-antenna transmission, the antenna selector 402 allocates the input signals to antennas used for transmission in sub-bands to which frequency resources allocated to a user determined by the scheduler 2041 belong. If it is assumed that the input signals are represented as s0 and s1 and the output signals are represented as x0, x1, x2, and x3, the transmission signal is allocated to each antenna as shown in the following.

$$\begin{bmatrix} x_0 \\ x_1 \\ x_2 \\ x_3 \end{bmatrix} = \begin{bmatrix} p_{00} & p_{01} \\ p_{10} & p_{11} \\ p_{20} & p_{21} \\ p_{30} & p_{31} \end{bmatrix} \begin{bmatrix} s_0 \\ s_1 \end{bmatrix} \begin{cases} p_{00} = p_{11} = 1, & \text{(Formula 5)} \\ \text{else} = 0 \text{ if using antenna is } (0, 1) \\ p_{00} = p_{21} = 1, \\ \text{else} = 0 \text{ if using antenna is } (0, 2) \\ p_{00} = p_{31} = 1, \\ \text{else} = 0 \text{ if using antenna is } (0, 3) \\ p_{10} = p_{21} = 1, \\ \text{else} = 0 \text{ if using antenna is } (1, 2) \\ p_{10} = p_{31} = 1, \\ \text{else} = 0 \text{ if using antenna is } (1, 3) \\ p_{20} = p_{31} = 1, \\ \text{else} = 0 \text{ if using antenna is } (2, 3) \end{cases}$$

Here, s0 is a signal supposed to be transmitted from the antenna 0, and s1 is a signal supposed to be transmitted from the antenna 1. Further, x0 is a signal transmitted from the antenna 0, x1 is a signal transmitted from the antenna 1, x2 is a signal transmitted from the antenna 2, and x3 is a signal transmitted from the antenna 3. If the output signal is 0, it means that no signal is transmitted from the antenna. In addition, (0, 1) in Formula 5 means that signals are transmitted from the antennas 0 and 1.

In FIG. 6, outputs of the antenna selector 402 are input to the power controllers 304. The power controllers 304 adjust the input signals to transmission power set by the scheduler 2041 and represented by Formula 3 or Formula 4. The signals with the power controlled by the power controllers 304 are input to the resource unit mapper 305. The resource unit mapper 305 maps the signal of each user to the resource allocated to each user in accordance with the frequency resource allocation set by the scheduler 2041. Mapping to the resource is performed for each antenna. The Inverse FFT (IFFT) 306 converts information of the frequency domain for each antenna into a time domain signal. The Cyclic Prefix Inserter (CPI) 307 adds a CP to the obtained time domain signal, and transmits a baseband transmission signal to the RF 202 of FIG. 5. The RF 202 converts the baseband signal to an RF signal to emit a transmission signal from the antenna 201.

It should be noted that the sub-bands A and B on the low-frequency side are used for 4-antenna transmission in FIG. 10, and the numbers of antennas are 4, 4, 2, and 2 in ascending order of frequencies. However, this has no special meaning, and the numbers may be 2, 4, 2, and 4.

According to the first embodiment, in an antenna-rich system in which signals are basically transmitted using two antennas, the transmission power of each antenna can be balanced, and signals can be transmitted while preventing the transmission power from being concentrated in specific antennas. Specifically, if it is assumed that the maximum transmission output of the entire base station device is 40 W, all antennas can transmit signals with a maximum output of 10 W of each transmission amplifier. In addition, according to the first embodiment, the base station device can be downsized as a result.

Second Embodiment

With reference to FIG. 12, operations of transmission power allocation/frequency resource allocation of a scheduler 2041 according to a second embodiment will be described. It should be noted that the configuration and the transmission signal process of the base station device in the second embodiment are the same as those in the first embodiment.

In FIG. 12, Step 201 and Step 202 are the same as Step 101 and Step 102 in FIG. 8.

Next, the scheduler 2041 selects sub-bands used for transmission belonging to 2-antenna transmission in each antenna (S203). Specifically, the scheduler 2041 selects sub-bands belonging to the lower half of frequencies among the areas where 2-antenna transmission is performed in the antennas 0 and 1, and selects sub-bands belonging to the other half in the antennas 2 and 3, so that sub-bands used for each antenna are determined. In each antenna, signals are not transmitted in the sub-bands that are not selected, and power allocation (to be described later) is not set for the antennas.

Thereafter, the scheduler 2041 allocates transmission power to each antenna (S204). This process is the same as Step 104 of FIG. 8.

The present invention is characterized in that if there is a frequency that is not used by all antennas in an antenna-rich system, specific antennas are not set to an inactive state but antennas that are not used are switched while dividing the frequency, so that the transmission power of each antenna is controlled to be substantially equalized in all frequencies. The operation of the scheduler that realizes this falls within the scope of the present invention.

What is claimed is:

1. A wireless communication system comprising a plurality of base station devices each configured to have an antenna power allocation function, the wireless communication system configured to realize a coverage area by scattering the plurality of base station devices, each having a plurality of antennas in service areas and configured to control transmission of signals in specific sub-bands using half of the antennas provided at each of the base station devices, wherein each of the base station devices is configured to divide a frequency band into a plurality of first sub-bands for transmitting signals using the plurality of antennas and a plurality of second sub-bands for transmitting signals using the half of the antennas, wherein each of the base station devices is configured to select antennas to transmit each of the second sub-bands, and wherein each of the base station devices is configured to determine transmission power of each sub-band on a basis of the number of first sub-bands and the number of the second sub-bands, wherein the transmission power of the first sub-bands and the transmission power of the second sub-bands can be adjusted to be different from each other.

2. The wireless communication system comprising base station devices according to claim 1, wherein when an antenna used in a sub-band is selected, each of the base station devices is configured to control the total amounts of transmission power transmitted by the plurality of antennas to be equivalent values.

3. A wireless communication method in a wireless communication system configured to realize a coverage area by scattering a plurality of base station devices, each having a plurality of antennas in service areas, the wireless communication method controlling transmission of signals in specific sub-bands using half of the antennas provided at each of the base station devices, the wireless communication method comprising the steps:

dividing a frequency band into a plurality of first sub-bands for transmitting signals using the plurality of antennas and a plurality of second sub-bands for transmitting signals using the half of the antennas;

selecting antennas for transmitting each of the second sub-bands; and determining transmission power of each sub-band on a basis of the number of first sub-bands and the number of the second sub-bands, where the transmission power of the first sub-band and the transmission power of the second sub-bands can be adjusted to be different from each other.

4. The wireless communication method according to claim 3, wherein when an antenna used in a sub-band is selected, the total amounts of transmission power transmitted by the plurality of antennas is controlled to be equivalent values.

5. A base station device in a wireless communication system configured to realize a coverage area by scattering a plurality of base station devices each having a plurality of antennas in service areas, the base station device configured to control transmission of signals in specific sub-bands using half of the antennas provided at each of the base station devices, the base station device comprising:

a processor configured to divide a frequency band into a plurality of first sub-bands for transmitting signals using the plurality of antennas and a plurality of second sub-bands for transmitting signals using the half of the antennas, select antennas for transmitting each of the second sub-bands, and determine transmission power of each sub-band on a basis of the number of first sub-bands and the number of second sub-bands, where the transmission power of the first sub-band and the transmission power of the second sub-band can be adjusted to be different from each other.

6. The base station device according to claim 5, wherein when an antenna used in a sub-band is selected, the processor is configured to control the total amounts of transmission power transmitted by the plurality of antennas to be equivalent values.

\* \* \* \* \*